（12） United States Patent
Tada (10) Patent No.: US 10,150,337 B2
(45) Date of Patent: Dec. 11, 2018

(54) PNEUMATIC TIRE (71) Applicant: Toyo Tire & Rubber Co., Ltd., Osaka-shi, Osaka (JP)

(72) Inventor: Masaru Tada, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 467 days.

(21) Appl. No.: 14/795,277

(22) Filed: Jul. 9, 2015

(65) Prior Publication Data

US 2016/0009142 A1  Jan. 14, 2016

(30) Foreign Application Priority Data

Jul. 14, 2014  (JP) .................. 2014-144377

(51) Int. Cl.
B60C 11/00  (2006.01)
B60C 11/03  (2006.01)
(Continued)

(52) U.S. Cl.
CPC ............ *B60C 11/0083* (2013.01); *B60C 5/00* (2013.01); *B60C 11/0304* (2013.01);
(Continued)

(58) Field of Classification Search
CPC ............ B60C 11/0083; B60C 11/1376; B60C 11/0304; B60C 11/04; B60C 11/0306;
(Continued)

(56) References Cited

U.S. PATENT DOCUMENTS 4,840,210 A  6/1989 Kukimoto
2011/0079334 A1  4/2011 Bott et al.
(Continued)

FOREIGN PATENT DOCUMENTS

JP  2005-263180 A  9/2005
JP  2013-189121 A  9/2013

OTHER PUBLICATIONS

Office Action dated Nov. 18, 2016, issued in counterpart Chinese Application No. 201510406053.8, with abridged English translation. (9 pages).
(Continued)

*Primary Examiner* — Steven D Maki
*Assistant Examiner* — Philip N Schwartz
(74) *Attorney, Agent, or Firm* — Westerman, Hattori, Daniels & Adrian, LLP (57) ABSTRACT There is provided a pneumatic tire with a tread portion having a plurality of main grooves extending in a tire circumferential direction, and a plurality of land portions partitioned by the main grooves. The tread portion is formed in such a manner that a see-through void area on a first side relative to an equatorial plane of the tire in a tire width direction is greater than a see-through void area on a second side in the tire width direction. Ground contact surfaces of the plurality of land portions formed between the main grooves swell outward from a datum contour line of the tread portion in a tire radial direction, and the amount of swelling of a land portion, positioned on the first side on which the see-through void area is large, relative to the datum contour line is smaller than that of a land portion positioned on the second side.

5 Claims, 4 Drawing Sheets (51) Int. Cl.
  *B60C 5/00*   (2006.01)
  *B60C 11/04*  (2006.01)
  *B60C 11/13*  (2006.01)
(52) U.S. Cl.
  CPC .......... *B60C 11/04* (2013.01); *B60C 11/1376* (2013.01); *B60C 11/0306* (2013.01); *B60C 2011/0341* (2013.01); *B60C 2011/0386* (2013.01)
(58) Field of Classification Search
  CPC ............... B60C 5/00; B60C 2011/0341; B60C 2011/0386
  See application file for complete search history.

(56) References Cited

U.S. PATENT DOCUMENTS

| | | |
|---|---|---|
| 2013/0240101 A1 | 9/2013 | Kameda |
| 2014/0166169 A1 | 6/2014 | Tanaka |

OTHER PUBLICATIONS

Office Action dated Jan. 10, 2017, issued in counterpart German Patent Application No. 10 2015 212 995.0, with English translation. (11 pages).

PNEUMATIC TIRE

CROSS-REFERENCE TO RELATED APPLICATIONS

This application is based upon and claims the benefit of priority from the prior Japanese Patent Application No. 2014-144377, filed on Jul. 14, 2014; the entire contents of which are incorporated herein by reference.

BACKGROUND

1. Technical Field

The present invention relates to a pneumatic tire.

2. Related Art

A plurality of main grooves, extending in a tire circumferential direction, are provided in a tread portion of a pneumatic tire, and for example, a non-symmetrical tread pattern is known in which see-through void areas are different from each other on a first side and a second side in a tire width direction because a plurality of main grooves with different groove widths are provided.

In the tread pattern configured with the non-symmetrical main grooves, ground pressure is non-uniform in the tire width direction. For this reason, distortion repeatedly exerted on groove bottoms of the main grooves may increase and become a cause of the occurrence of cracking at the groove bottoms. In particular, when a main groove with a large groove width is provided, ground pressure increases at the edge of a land portion adjacent to the main groove, and distortion at a groove bottom of the main groove tends to become excessively large. For this reason, it is necessary to reduce non-uniformity in ground pressure, that is, to uniformize ground pressure so that the occurrence of cracking at the groove bottom is prevented.

In a tire disclosed in JP-A-2013-189121 (KOKAI), in order to improve grounding property of the entire tread portion in a tire width direction and steering stability, ground contact surfaces of a center land portion and an intermediate land portion protrude or swell by predetermined amounts outward relative to a datum contour line of a tread portion in a tire radial direction, and are formed in such a manner that the amount of swelling of the center land portion is greater than that of the intermediate land portion.

In a tire disclosed in JP-A-2005-263180 (KOKAI), in order to improve steering stability during cornering via an improvement in ground contact pattern, the ground contact surface of a rib formed between main grooves swells outward relative an outer contour line, passing through the ground contact surface of a shoulder rib, in a tire radial direction, and the swelling apex of each rib is disposed while being offset inward from the center line of the rib in a state where the tire is mounted in a vehicle.

In the tire disclosed in JP-A-2013-189121 (KOKAI), the ground contact surfaces of a plurality of the land portions provided in the tread portion are formed to have different amounts of swelling, and in the tire disclosed in JP-A-2005-263180 (KOKAI), the ground contact surfaces of a plurality of the land portions swell, and the swelling apexes of the ground contact surfaces are respectively set to be positioned offset from the centers of the land portions in a width direction of the land portions. However, in none of these documents, is a method disclosed for uniformizing ground pressure and preventing the occurrence of cracking at groove bottoms in a non-symmetrical tread pattern in which right and left see-through void areas are different.

SUMMARY

An object of the invention is to provide a pneumatic tire that can prevent the occurrence of cracking at groove bottoms in a non-symmetrical tread pattern in which right and left see-through void areas are different.

According to an embodiment, there is provided a pneumatic tire with a tread portion including a plurality of main grooves extending in a tire circumferential direction, and a plurality of land portions partitioned by the main grooves. The tread portion is formed in such a manner that a see-through void area on a first side relative to an equatorial plane of the tire in a tire width direction is greater than a see-through void area on a second side relative to the equatorial plane in the tire width direction. Ground contact surfaces of the plurality of land portions formed between the main grooves swell outward from a datum contour line of the tread portion in a tire radial direction, and the amount of swelling of a land portion, positioned on the first side on which the see-through void area is large, relative to the datum contour line is smaller than that of a land portion positioned on the second side.

In a non-symmetrical tread pattern with different right and left see-through void areas in the embodiment, since an amount of swelling of a ground contact surface of a land portion positioned on a side on which a see-through void area is small, is set to be greater than an amount of swelling of a ground contact surface of a land portion positioned on another side on which a see-through void area is large, it is possible to prevent an increase in the ground pressure of the land portion positioned on the other side on which the see-through void area is large. For this reason, it is possible to reduce distortion, and to prevent the occurrence of cracking at the groove bottoms.

DETAILED DESCRIPTION

Figure 1:
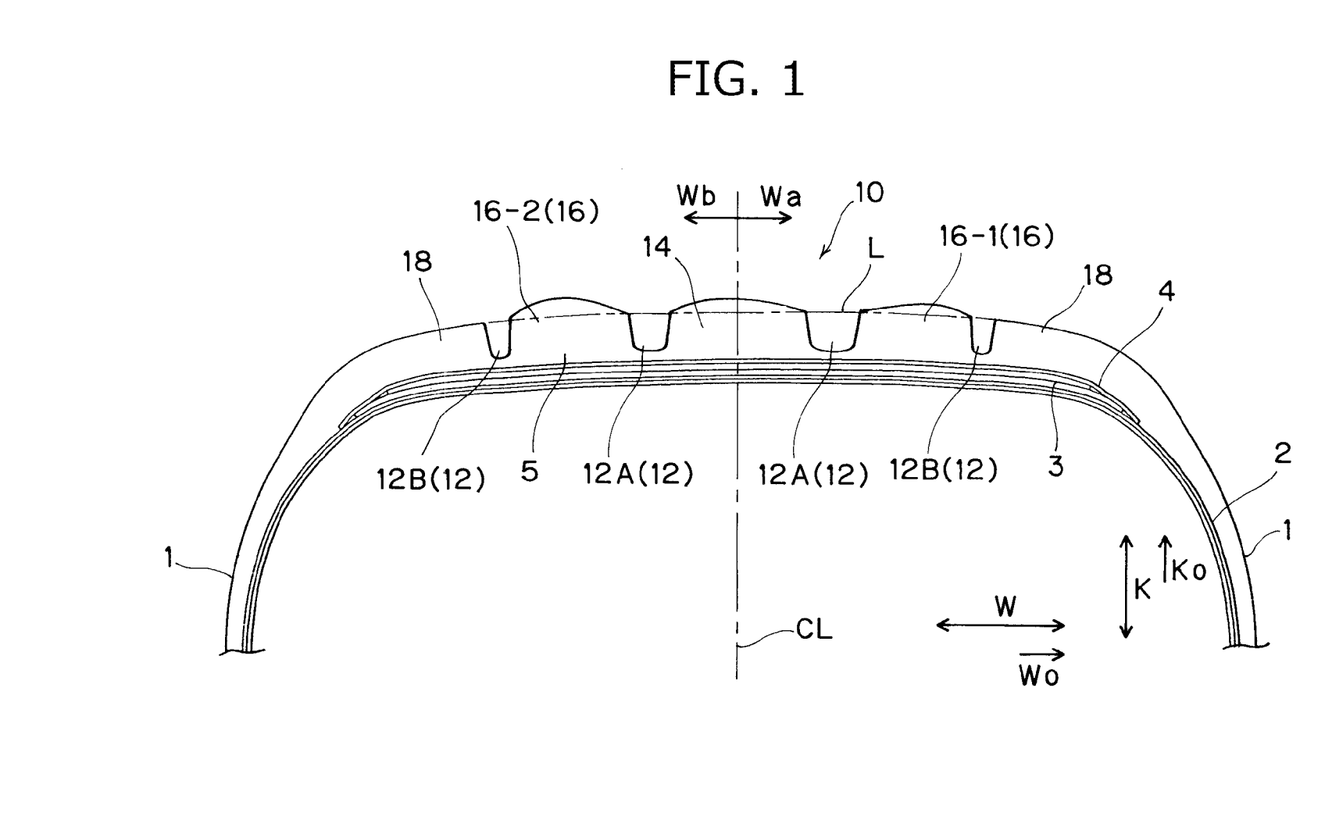
FIG. 1 is a cross-sectional view illustrating part of a pneumatic tire according to an embodiment.

FIG. 1 is a sectional view taken along a width direction (meridian direction) W of a tire (that is, a tire width direction W), which illustrates the vicinity of a tread portion of a pneumatic tire according to an embodiment. This tire is a pneumatic radial tire for a passenger vehicle, and includes a tread portion 10, a pair of right and left bead portions (not illustrated), and sidewall portions 1, 1. The tread portion 10 is provided to connect outer end portions of the right and left sidewall portions 1, 1 together in a radial direction K of the tire (that is, a tire radial direction K). In the drawing, CL represents an equatorial plane of the tire, and is equivalent to the center of the tire width direction W.

A carcass 2 is embedded in the pneumatic tire, and is formed of at least one carcass ply that extends across the pair of bead portions. The carcass 2 extends from the tread portion 10 through the sidewall portion 1, and both end portions of the carcass 2 are respectively locked to the bead portions. A belt 3 is provided farther outward than the outer circumference of the carcass 2 in the tread portion 10. The belt 3 is formed of a plurality of belt plies formed by arranging belt cords at a shallow inclination angle in a circumferential direction of the tire, and in this example, the belt 3 is formed of two belt plies. A belt reinforced layer 4 is provided farther outward than the outer circumference of the belt 3, and is formed by a fiber cord provided along the circumferential direction of the tire.

A tread rubber 5 is formed farther outward than the outer circumference of the belt 3 (specifically, farther outward than the outer circumference of the belt reinforced layer 4), and the tread rubber 5 forms the surface of the tread portion 10, which is a ground contact surface of the tire.

Figure 4:
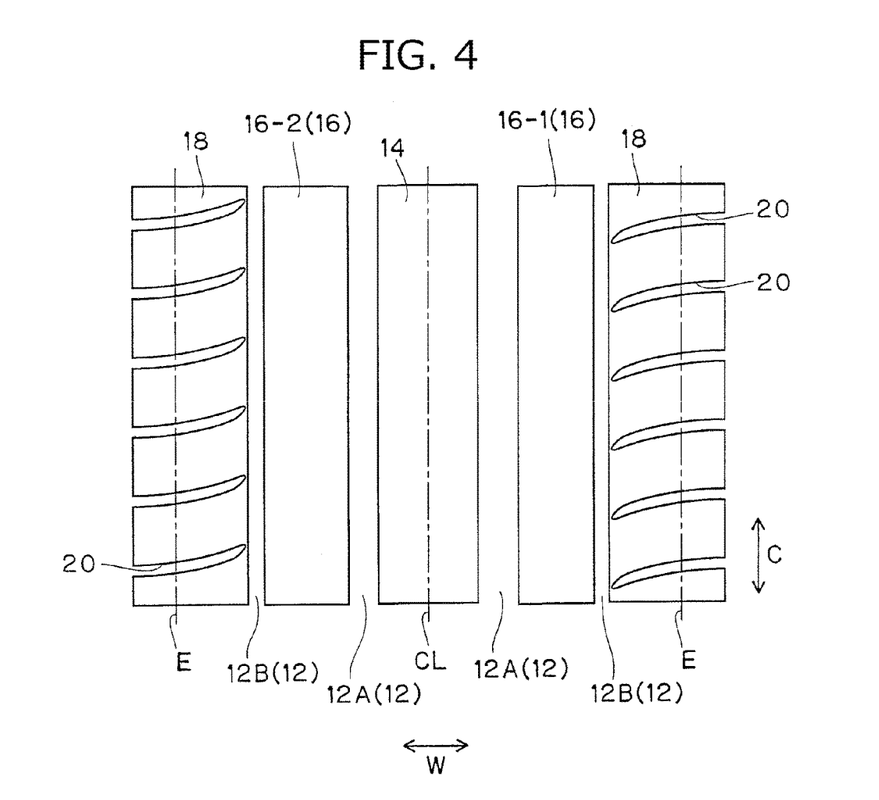
FIG. 4 is a development view illustrating a tread pattern of the pneumatic tire.

As illustrated in FIGS. 1 and 4, a plurality (in this example, four) of straight main grooves 12 are provided in the surface of the tread portion 10 and extend in a circumferential direction C of the tire (that is, a tire circumferential direction C). In this example, the main grooves 12 are formed of a pair of central main grooves 12A, 12A which are respectively disposed on both sides with the equatorial plane CL of the tire interposed between the central main grooves 12A, 12A and a pair of shoulder main grooves 12B, 12B which are respectively disposed outsides Wo of the pair of central main grooves 12A, 12A in the tire width direction. The outside Wo in the tire width direction represents a side that is further away from the equatorial plane CL of the tire in the tire width direction W. E represents an end of ground contact of the tread.

A plurality of land portions are formed in the tread portion 10 while being partitioned by the main grooves 12. Specifically, the tread portion 10 is provided with a central land portion 14 formed between the pair of right and left central main grooves 12A, 12A; a pair of right and left intermediate land portions 16, 16, each of which is formed between the central main groove 12A and the shoulder main groove 12B; and a pair of right and left shoulder land portions 18, 18 which are respectively formed the outsides Wo of the pair of right and left shoulder main grooves 12B, 12B in the tire width direction.

As illustrated in FIG. 4, the central land portion 14 and the intermediate land portions 16 are ribs which are continuously formed around the entire circumference of the tire in the tire circumferential direction C without being disconnected in the tire circumferential direction C. In contrast, a plurality of lateral grooves 20 are provided in the shoulder land portion 18 while being separated from each other by a gap in the tire circumferential direction C, and the plurality of lateral grooves 20 extend in a direction intersecting the tire circumferential direction C. The extension of the lateral groove 20 from a side edge of the tread in the tire width direction ends in front of the shoulder main groove 12B, and thus the shoulder land portion 18 is formed as an array of blocks in which a plurality of blocks, actually partitioned by the lateral grooves 20, are aligned in the tire circumferential direction C. Both the central land portion 14 and the intermediate land portion 16 may be an array of blocks in which a plurality of the blocks, partitioned by the lateral grooves, are aligned in the tire circumferential direction, and the shoulder land portion 18 may be continuously formed around the entire circumference of the tire in the tire circumferential direction C.

In the tread portion 10, a see-through void area (Sa) on a first side Wa relative to the equatorial plane CL of the tire in the tire width direction is formed to be greater than a see-through void area (Sb) on a second side Wb in the tire width direction (Sa>Sb). Here, the see-through void area represents the sectional area (lateral sectional area illustrated in FIG. 1) of a see-through portion of a circumferential groove (the see-through portion in which there is no land portion present when seen in the tire circumferential direction C, that is, unobstructed view in the tire circumferential direction C can be got) provided in the tread portion 10. When the sectional shape of the straight main groove 12 is uniform as illustrated in FIG. 4, the sectional areas of the main grooves 12 illustrated in FIG. 1 is the see-through void area as is (For this reason, hereinafter, the see-through void area may be simply referred to as a groove sectional area). The see-through void area (Sa) on the first side Wa in the tire width direction is a total of all of the see-through void areas of circumferential grooves present on the first side Wa, and the see-through void area (Sb) on the second side Wb in the tire width direction is a total of all of the see-through void areas of circumferential grooves present on the second side Wb.

Figure 2:
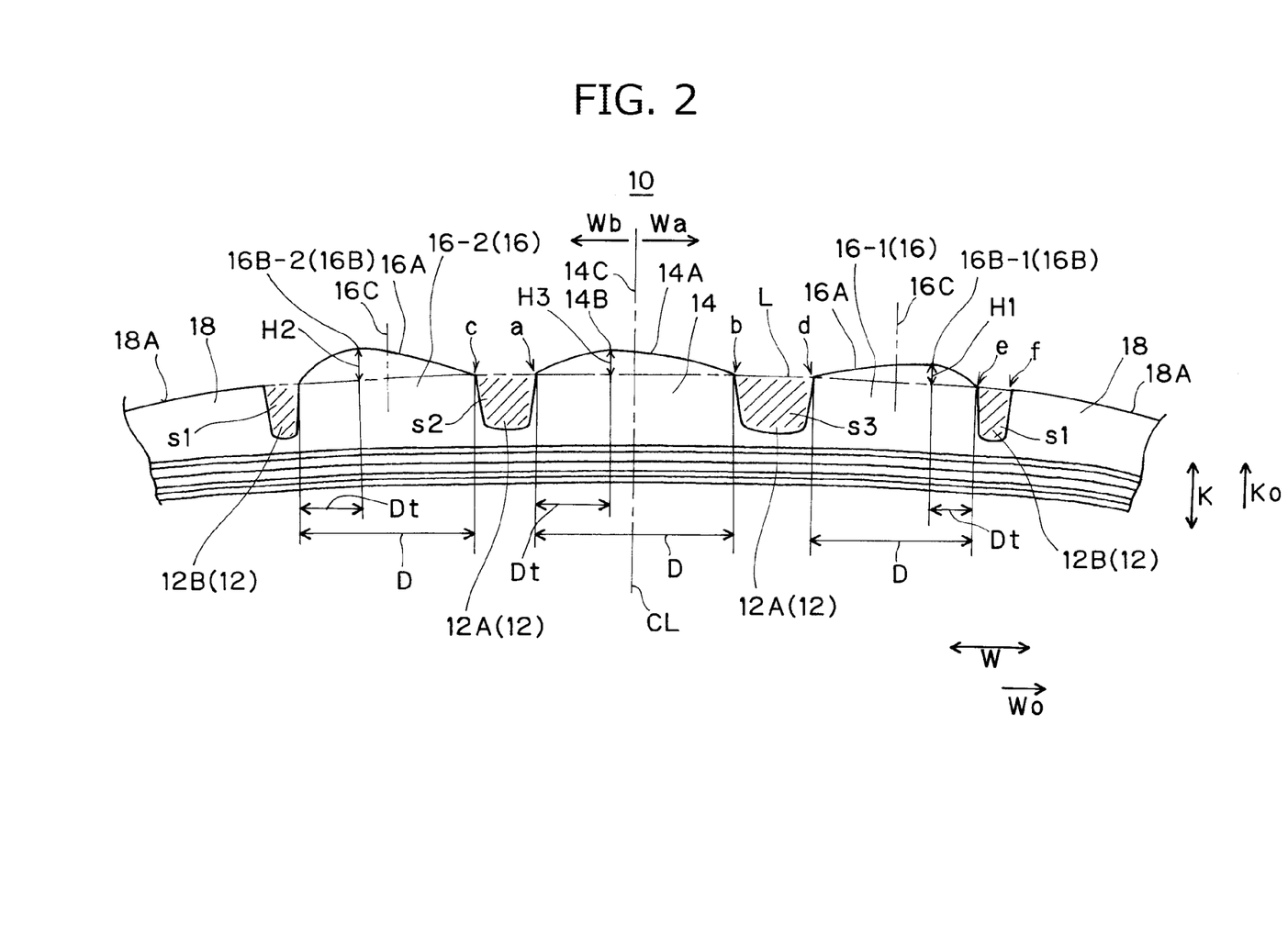
FIG. 2 is an enlarged sectional view of main parts of a tread portion in FIG. 1.

In the embodiment, since the plurality of main grooves 12 with different groove sectional areas are provided, the see-through void areas in the tread portion 10 become different from each other in the tire width direction W such that Sa is greater than Sb (Sa>Sb). Specifically, as illustrated in FIG. 2, a groove sectional area s1 of the shoulder main groove 12B on the first side Wa is equal to that of the shoulder main groove 12B on the second side Wb, and in contrast, a groove sectional area s3 of the central main groove 12A on the first side Wa is set to be greater than a groove sectional area s2 of the central main groove 12A on the second side Wb, and Sa (=s3+s1) is greater than Sb (=s2+s1). It is possible to change the groove sectional area by adjusting a groove width and/or a groove depth, and in this example, the groove sectional areas are set to be different from each other by changing the groove widths.

A ground contact surface 14A of the land portion 14 and a ground contact surface 16A of the land portion 16 formed between the main grooves 12, 12 swell (i.e. protrude or bulge) toward outside Ko from a datum contour line L of the tread portion 10 in the tire radial direction. As illustrated in FIG. 2, the ground contact surface 14A of the central land portion 14 and the ground contact surfaces 16A of the pair of intermediate land portions 16, 16 swell toward the outside Ko from the datum contour line L in the tire radial direction, and the central land portion 14 and the intermediate land portions 16, 16 have a convex section, the outline of which is curved outward. Accordingly, the central land portion 14 and the pair of intermediate land portions 16, 16 are formed in a semi-cylindrical shape. In contrast, the shoulder land portions 18, 18 do not swell from the datum contour line L, that is, a ground contact surface 18A of the shoulder land portion 18 is on the datum contour line L.

Here, the datum contour line L is a curved datum line that is used for defining a tread surface in the section along the tire width direction W, and typically, the datum contour line L can be regarded as a design profile of a tire tread, which is a curved line formed by connecting a plurality of circular arcs together via contact points that have common tangential lines. Specifically, the datum contour line L is a smooth continuous curved line that passes through opening ends of the main grooves 12 (edges of the land portions 14, 16, and 18), and is formed of one or a plurality of circular arcs. For example, when the opening ends of all of main grooves 12 are present on a single circular arc, the circular arc is the datum contour line L. Typically, the opening ends of all of the main grooves 12 are not present on a single circular arc, and the datum contour line L is formed of a plurality of circular arcs, and is defined in the following manner. As illustrated in FIG. 2, both edges a and b of the central land portion 14 are obtained, edges c and d of the intermediate land portions 16, adjacent to the central land portion 14 with the central main groove 12A interposed therebetween, are obtained, and the datum contour line L is defined as a circular arc with a larger curvature radius chosen from a circular arc passing through the points a, b, and c, and a circular arc passing through the points a, b, and d. The basic reason for this is that the curvature radius of the central land portion 14 is large, and a circular arc with a larger curvature radius is typically similar to the design profile of the central land portion 14. In the intermediate land portion 16, the datum contour line L is defined as a circular arc that passes through three points b, d, and e: both edges d and e of the intermediate land portion 16; and the edge b of the central land portion 14 adjacent to the intermediate land portion 16 with the center main groove 12A interposed therebetween. Since a design profile is formed of a circular arc with a small curvature radius when an edge of a land portion is further away from the equatorial plane CL of the tire, if the datum contour line L of the intermediate land portion 16 is defined as a circular arc that passes through an edge f of the shoulder land portion 18 outwardly adjacent to the intermediate land portion 16, the datum contour line L may be smaller than that required for a circular arc of the design profile. For this reason, the datum contour line L is defined using the edge b of the central land portion 14 inwardly adjacent to the intermediate land portion 16.

In the embodiment, an amount of swelling (distance from the swelling apex to the datum contour line L) of the central land portion 14 and the intermediate land portion 16 relative to the datum contour line L is set as follows.

An amount of swelling H2 of an intermediate land portion 16-2 positioned on the second side Wb is greater than an amount of swelling H1 of an intermediate land portion 16-1 positioned on the first side Wa (H1<H2) on which a see-through void area is large. The ratio of the amount of swelling H1 to the amount of swelling H2 is not limited to a specific ratio, and for example, may be set as follows based on the ratio of the see-through void area Sb to the see-through void area Sa: H1/H2=(Sb/Sa)×k. Here, k is a value from 0.6 to 1.25 based on the condition that H1 is less than H2 (H1<H2).

An amount of swelling H3 of the central land portion 14, positioned on the equatorial plane CL of the tire, relative to the datum contour line L is greater than the amount of swelling H1 of the intermediate land portion 16-1 positioned on the first side Wa, and is less than the amount of swelling H2 of the intermediate land portion 16-2 positioned on the second side Wb (H1<H3<H2). Preferably, the amount of swelling H3 is a median value between the amount of swelling H1 and the amount of swelling H2.

The amounts of swelling H1, H2, and H3 (that is, amounts of swelling of the plurality of land portions 14 and 16, formed between the main grooves 12, 12, relative to the datum contour lines L) are preferably set to be in a range between 0.5% and 7% of the total groove width of all of the main grooves 12 provided in the tread portion 10. It is possible to prevent an excessive increase in the ground pressure of the swelled land portions 14 and 16 by setting the amount of swelling in this range. More specifically, the maximum amount of swelling H2 may be set to a value from 0.5 mm to 2.0 mm. Here, the groove width is a width at the opening end of the main groove 12.

In the embodiment, any one of the central land portion 14 and the intermediate land portions 16, 16 is interposed between two main grooves 12, 12 with different groove sectional areas. In this case, preferably, groove sectional areas on both sides of each land portion are compared to each other, and a swelling apex is set to be offset toward a main groove with a small groove sectional area. That is, a swelling apex 14B of the land portion 14 and a swelling apex 16B of the land portion 16 are respectively set to be positioned offset toward the main groove 12 with a small groove sectional area from a lateral center 14C of the land portion 14 and a lateral center 16C of the land portion 16.

Figure 3:
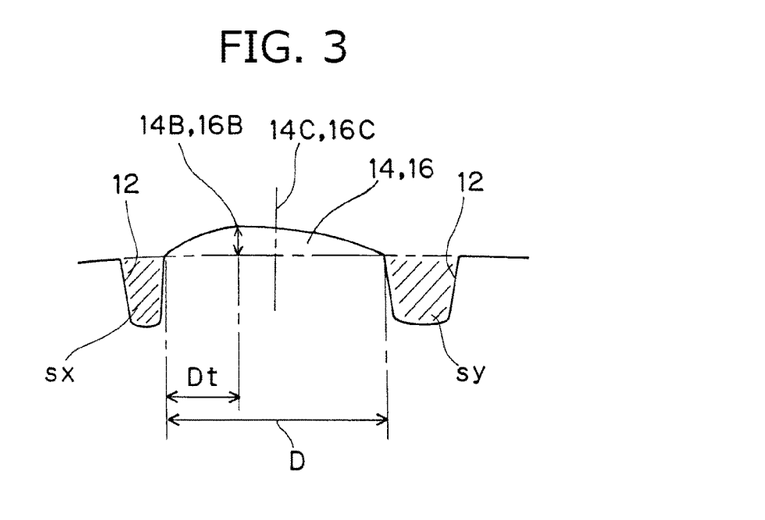
FIG. 3 is an enlarged view of the main parts in FIG. 2.

The positions of the swelling apexes 14B and 16B are preferably set based on the ratio between the groove sectional areas on both sides of each land portion. For example, as illustrated in FIG. 3, when sx and sy respectively refer to the groove sectional areas of the main grooves 12, 12 on both sides of each of the land portions 14 and 16 (sx<sy), D refers to the dimensions of the land portions 14 and 16 in the tire width direction, and Dt refers to the distance from the edge of a main groove with a small groove sectional area to the swelling apexes 14B and 16B in the tire width direction W, it is possible to set Dt to be equal to i×D×(sx/(sx+sy)). Here, i is a value from 0.75 to 1.25 based on the condition that Dt is less than 0.5 D (Dt<0.5 D).

In the example illustrated in FIG. 2, when the ratio between the groove sectional areas of the main grooves 12, that is, s1:s2:s3:s1 is equal to 1:2:3:1, the ratio between the groove sectional areas on both sides of the intermediate land portion 16-1 on the first side Wa, that is, s3:s1 is equal to 3:1, and thus the distance Dt from the edge of the shoulder main groove 12B with the groove sectional area s1 to a swelling apex 16B-1 is set to be equal to i×D×(¼). Since the ratio between the groove sectional areas on both sides of the intermediate land portion 16-2 on the second side Wb, that is, s1:s2 is equal to 1:2, the distance Dt from the edge of the shoulder main groove 12B with the groove sectional area s1 to a swelling apex 16B-2 is set to be equal to i×D×(⅓). Since the ratio between the groove sectional areas on both sides of the central land portion 14, that is, s2:s3 is equal to 2:3, the distance Dt from the edge of the central main groove 12A with the groove sectional area s2 to the swelling apex 14B is set to be equal to i×D×(⅖).

For example, when a circumferential groove with a narrow groove width such as a subsidiary groove is provided, and the ratio of the groove sectional area of the circumferential groove to that of a comparative main groove is greater than or equal to a ratio of 1 to 5, the positions of the swelling apexes 14B and 16B may be set based on the condition that the main groove does not include the circumferential groove, and both land portions, between which the circumferential groove is interposed, are considered to be one integral land portion.

The datum contour line L and the amounts of swelling of the land portions 14 and 16 are determined in a normal no-load state in which a pneumatic tire is mounted on a normal rim, and the pneumatic tire is filled with air to a normal internal pressure, and in this state, the datum contour line L and the amounts of swelling of the land portions 14 and 16 are obtained by measuring the shape of the tire using a laser-beam shape measuring apparatus. The normal rim is defined as a "standard rim" according to JATMA standards, a "design rim" according to TRA standards, and a "measuring rim" according to ETRTO standards. The normal internal pressure is defined as the "maximum air pressure" according to JATMA standards, the "maximum value" disclosed in the section "tire load limits at various cold inflation pressures" of TRA standards, and an "inflation pressure" according to ETRTO standards.

In the non-symmetrical tread pattern of the embodiment with different right and left see-through void areas, since the amount of swelling H1 of the ground contact surface 16A of the intermediate land portion 16-1, positioned on the first side Wa on which a see-through void area is large, is set to be less than the amount of swelling H2 of the ground contact surface 16A of the intermediate land portion 16-2 positioned on the second side Wb on which a see-through void area is small, it is possible to prevent an increase in the ground pressure of the intermediate land portion 16-1 positioned on the first side Wa on which the see-through void area is large, and to uniformize the ground pressures on the first side Wa and the second side Wb.

Since the positions of the swelling apex 14B of the central land portion 14 and the swelling apex 16B of the intermediate land portion 16 are set to be offset toward a main groove with a small groove sectional area, based on the ratio between the groove sectional areas on both sides of each land portion, it is also possible to uniformize the ground contact pressures in each of the land portions 14 and 16. That is, the maximum swelling position (swelling apex) is set to be offset toward the opposite edge to an edge of a main groove with a large groove sectional area, in which ground contact pressure is likely to increase, even if the main groove 12 with a large groove width and therefore having a large groove sectional area is provided, and it is possible to prevent an increase in ground pressure at the edge of the main groove with the large groove sectional area, and to uniformize ground pressure.

Since the amount of swelling H3 of the central land portion 14 positioned on the equatorial plane CL of the tire is set to a value between the amount of swelling H1 of the intermediate land portion 16-1 on the first side Wa and the amount of swelling H2 of the intermediate land portion 16-2 on the second side Wb, it is possible to further uniformize the ground pressure of the entire tread portion 10.

As described above, in the embodiment, even if the main groove 12 with a large groove width is included, and a non-symmetrical tread pattern with different right and left see-through void areas is adopted, it is possible to uniformize the ground pressure of the tread portion 10. As a result, it is possible to decrease distortion repeatedly exerted on the groove bottoms of the main grooves 12, and to prevent the occurrence of cracking at the groove bottoms.

In the embodiment, the entire plurality of land portions 14 and 16, 16, formed between the main grooves 12, are interposed between two main grooves 12, 12 with different groove sectional areas; however, at least one of the land portions may be interposed between two main grooves with different groove sectional areas. In the embodiment, the four main grooves 12 have three types of groove sectional areas; however, the groove sectional areas of all of the main grooves may be different from each other, or at least one of the main grooves may have a different groove sectional area. As described above, in particular, the embodiment is effective in solving problems with a tread pattern having a main groove with a large groove width, and for example, the main groove has a large groove width exceeding 10 mm, and preferably a large groove width exceeding 10 mm, and less than or equal to 20 mm.

In the embodiment, the central land portion 14, the pair of intermediate land portions 16, 16, and the pair of shoulder land portions 18, 18 are provided while being partitioned off by the four main grooves 12; however, insofar as a plurality of land portions are formed between main grooves, the number of main grooves is not limited to four, and for example, three main grooves or five main grooves may be provided.

Figure 5:
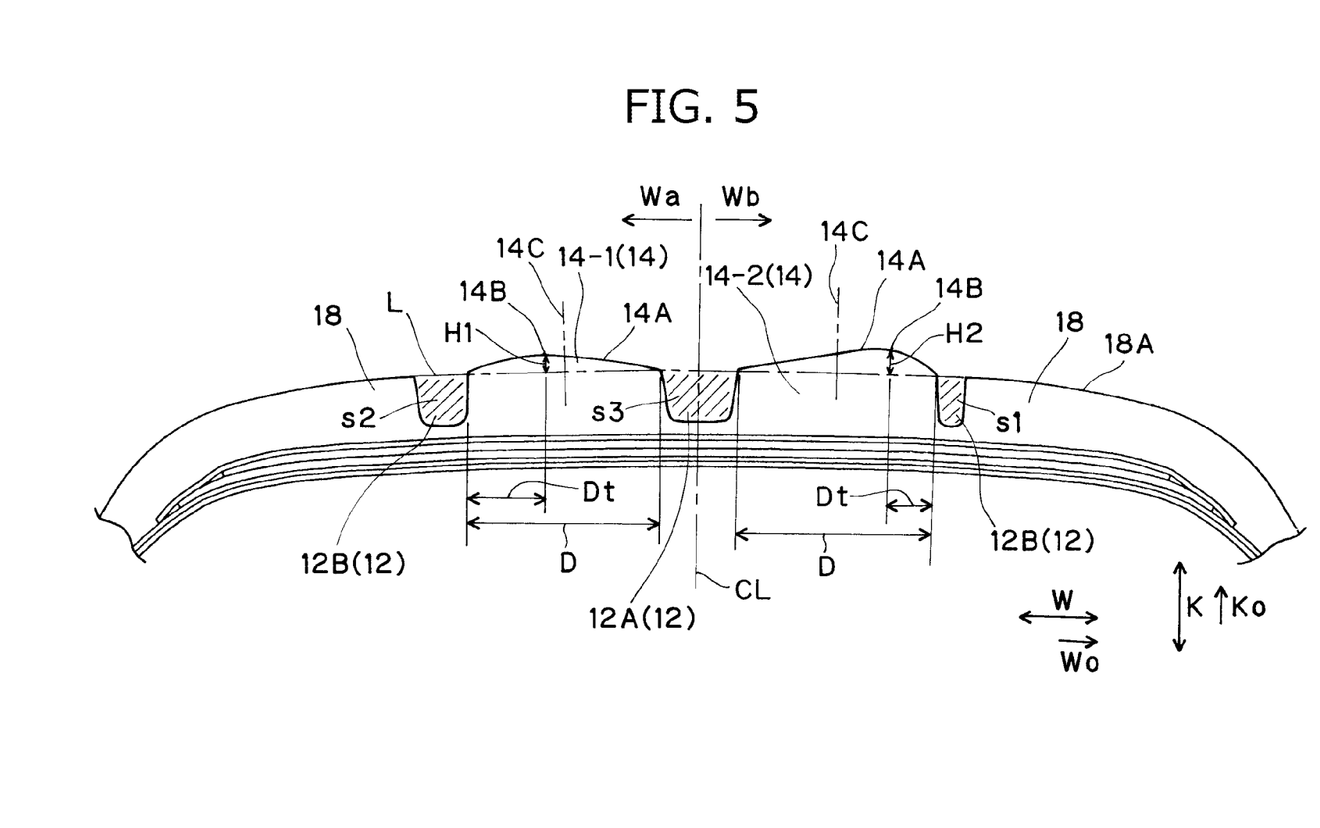
FIG. 5 is a cross-sectional view of a tread portion of a pneumatic tire according to another embodiment.

FIG. 5 illustrates an example in which three main grooves 12 are provided, and a tread portion includes one central main groove 12A provided on the equatorial plane CL of the tire; the pair of shoulder main grooves 12B, 12B which are respectively disposed the outsides Wo in the tire width direction; the pair of right and left central land portions 14, 14, each of which is interposed between the central main groove 12A and each of the pair of right and left shoulder main grooves 12B, 12B; and the pair of right and left shoulder land portions 18, 18 which are respectively formed the outsides Wo of the pair of right and left shoulder main grooves 12B, 12B in the tire width direction. The groove sectional area s3 of the central main groove 12A is the maximum area allowed, and in regard to the shoulder main groove 12B, the groove sectional area s2 of the shoulder main groove 12B positioned on the first side Wa relative to the equatorial plane CL of the tire in the tire width direction is set to be greater than the groove sectional area s1 of the shoulder main groove 12B positioned on the second side Wb. Accordingly, in the tread portion, the see-through void area (Sa) on the first side Wa is formed to be larger than the see-through void area (Sb) on the second side Wb in the tire width direction (Sa>Sb). The ground contact surfaces 14A, 14A of the pair of central land portions 14, 14 swell toward the outside Ko from the datum contour line L in the tire radial direction, and the amount of swelling H1 of a central land portion 14-1, positioned on the first side Wa on which a see-through void area is large, is smaller than the amount of swelling H2 of a central land portion 14-2 positioned on the second side Wb (H1<H2). In addition, similar to the aforementioned embodiment, the positions of the swelling apexes 14B of the central land portions 14-1 and 14-2 are set to be offset toward to a main groove with a small groove sectional area based on the ratio between groove sectional areas on both sides of each land portion.

Either one of the first side Wa on which a see-through void area is large, and the second side Wb on which a see-through void area is small may be positioned inward or outward when the tire is mounted in a vehicle.

Some embodiments have been described; however, these embodiments are presented as examples, and are not intended to limit the scope of the invention. New embodiments can be implemented in other various forms, and various omissions, replacements, and changes can be made to embodiments insofar as the omissions, the replacements, and the changes do not depart from the scope of the invention.

EXAMPLES

Pneumatic radial tires (size: 205/60R16) for a passenger vehicle of Examples 1 to 3 and Comparative Examples 1 to 3 were experimentally manufactured in order to understand the effects of the embodiments. The experimental tires were manufactured with the same basic tread pattern and internal tire structure but the specifications in Table 1 were changed.

Specifically, Comparative Examples 1 and 2, and Examples 1 and 2 had four main grooves as illustrated in FIGS. 1 to 3. The tire of Comparative Example 1 was a control tire, and in Comparative Example 1, the ground contact surfaces of the central land portion 14 and the intermediate land portions 16, 16 did not swell, and the entire tread surface was formed on the datum contour line L. In Comparative Example 2 and Examples 1 and 2, the ground contact surfaces of the central land portion 14 and the intermediate land portions 16, 16 swelled unlike those in Comparative Example 1. The width D of the central land portion 14 and the intermediate land portions 16, 16 was set to 30 mm, and in regard to the groove widths of the main grooves 12, the groove width of the main groove with the maximum groove sectional area was set to 15 mm.

Comparative Example 3 and Example 3 had three main grooves as illustrated in FIG. 5. The tire of Comparative Example 3 was a control tire, and the entire tread surface was formed on the datum contour line L, and in Example 3, the ground contact surfaces of the central land portions 14, 14 swelled unlike those in Comparative Example 3. The width D of a pair of the central land portions 14, 14 was set to 30 mm, and the groove width of the main groove 12 with the maximum groove sectional area was set to 15 mm.

The ground pressure distribution and the groove crack resistance of the pneumatic tires of Examples and Comparative Examples were evaluated. Evaluation methods are as follows.

intermediate land portions were set opposite to those in the aforementioned embodiment, and the swelling apexes were set opposite to those in the aforementioned embodiment. Therefore, ground pressure became more non-uniform than that in Comparative Example 1 which is the control, and groove crack resistance further deteriorated. In contrast, in Example 1 (the position of each swelling apex was at the center of the land portion in the tire width direction) in which the amounts of swelling of the central land portion and the intermediate land portions were set such that H1<H3<H2 similar to the aforementioned embodiment, ground pressure became uniform, and groove crack resistances improved compared to those in Comparative Example 1. In Example 2 in which the amounts of swelling were set such that H1<H3<H2, and the swelling apexes were also set as in the aforementioned embodiment, ground pressure became more uniform, and good groove crack resistance was obtained. Similarly, also in Example 3 and Comparative Example 3 with three main grooves, Example 3 has uniform ground pressure, and good groove crack resistance compared those in Comparative Example 3.

TABLE 1

|  | Comparative Example 1 | Comparative Example 2 | Example 1 | Example 2 | Comparative Example 3 | Example 3 |
|---|---|---|---|---|---|---|
| Configuration of Tread Portion | Four Main Grooves (FIG. 2) s1:s2:s3:s1 = 1:2:3:1 Sa:Sb = 4:3 H1 = 0 mm H2 = 0 mm H3 = 0 mm | Four Main Grooves (FIG. 2) s1:s2:s3:s1 = 1:2:3:1 Sa:Sb = 4:3 H1 = 0 mm H2 = 0.5 mm H3 = 0.75 mm H1 > H3 > H2 16-1: Dt = 22.5 mm 16-2: Dt = 20.0 mm 14: Dt = 18.0 mm | Four Main Grooves (FIG. 2) s1:s2:s3:s1 = 1:2:3:1 Sa:Sb = 4:3 H1 = 0.5 mm H2 = 1.0 mm H3 = 0.75 mm H2 > H3 > H1 16-1: Dt = 15.0 mm 16-2: Dt = 15.0 mm 14: Dt = 15.0 mm | Four Main Grooves (FIG. 2) s1:s2:s3:s1 = 1:2:3:1 Sa:Sb = 4:3 H1 = 0.5 mm H2 = 1.0 mm H3 = 0.75 mm H2 > H3 > H1 16-1: Dt = 7.5 mm 16-2: Dt = 10.0 mm 14: Dt = 12.0 mm | Three Main Grooves (FIG. 5) s2:s3:s1 = 2:3:1 Sa:Sb = 2:1 H1 = 0 mm H2 = 0 mm | Three Main Grooves (FIG. 5) s2:s3:s1 = 2:3:1 Sa:Sb = 2:1 H1 = 0.5 mm H2 = 1.0 mm H2 > H1 14-1: Dt = 12.0 mm 14-2: Dt = 7.5 mm |
| Ground Pressure Distribution | 100 | 96 | 103 | 105 | 100 | 106 |
| Groove Crack Resistance | 100 | 94 | 104 | 107 | 100 | 107 |

(1) Ground Pressure Distribution

The test tire was mounted onto a normal rim, and was filled with air to a normal internal pressure. Ground pressure was measured by pressing the test tires against pressure sensitive paper at 70% of the maximum load stated in JATMA standards. The reciprocal number of the difference between the maximum ground pressure and the minimum ground pressure of the ground contact surface was expressed as an index based on the condition that the values of Comparative Example 1 and Comparative Example 3 were to be 100 for the tires with four main grooves and the tires with three main grooves, respectively. Ground pressure was uniformized in proportion to an increase in index.

(2) Groove Crack Resistance

The test tire was assembled onto a normal rim, was filled with air to a normal internal pressure, and was run on a drum at a speed of 40 km/h with 80% of a normal load applied to the tire. The travel distance until the occurrence of cracking at a groove bottom of the main groove was expressed as an index based on the condition that the values of Comparative Example 1 and Comparative Example 3 were to be 100 for the tires with four main grooves and the tires with three main grooves, respectively. The cracking was unlikely to occur, and good groove crack resistance was obtained in proportion to an increase in index.

The results are illustrated in Table 1. In Comparative Example 2, the amounts of swelling H1 and H2 of the

What is claimed is:

1. A pneumatic tire comprising a tread portion comprising a plurality of main grooves extending in a tire circumferential direction, and a plurality of land portions formed between the main grooves,
   wherein the tread portion is formed in such a manner that a see-through void area on a first side relative to an equatorial plane of the tire in a tire width direction is greater than a see-through void area on a second side relative to the equatorial plane in the tire width direction,
   wherein ground contact surfaces of the plurality of land portions formed between the main grooves swell outward from a datum contour line of the tread portion in a tire radial direction, and the amount of swelling, relative to the datum contour line, of a first land portion positioned entirely on the first side is smaller than the amount of swelling of a second land portion positioned entirely on the second side,
   wherein the swelling of the first land portion has a convex shape that is curved outward from the datum contour line, and the swelling of the second land portion has a convex shape that is curved outward from the datum contour line,
   wherein the first land portion positioned entirely on the first side is sandwiched between a first pair of two main grooves having different see-through void areas, and the second land portion positioned entirely on the second side is sandwiched between a second pair of two main grooves having different see-through void areas, and wherein a swelling apex of said first land portion is positioned offset from the center of said first land portion toward a main groove of the first pair of two main grooves having a smaller see-through void area, and a swelling apex of said second land portion is positioned offset from the center of said second land portion toward a main groove of the second pair of two main grooves having a smaller see-through void area.

2. The pneumatic tire according to claim 1, which satisfies a relationship of $Dt=i \times D \times (sx/(sx+sy))$, wherein sx and sy respectively represent the see-through void areas of the two main grooves on both sides of the land portion interposed between the two main grooves (sx<sy), D represents a dimension of the land portion interposed between the two main grooves in the tire width direction, Dt represents a distance from an edge of the main groove with the smaller see-through void area than the main groove on the opposite side of said land portion interposed between the two main grooves to the swelling apex in the tire width direction, and i represents a value from 0.75 to 1.25 based on the condition that Dt is less than 0.5D.

3. The pneumatic tire according to claim 1, wherein amounts of swelling of the plurality of land portions, formed between the main grooves, relative to the datum contour line are set to be in a range between 0.5% and 7% of the total groove width of all of the main grooves provided in the tread portion.

4. The pneumatic tire according to claim 1, wherein an amount of swelling, relative to the datum contour line, of a land portion positioned on the equatorial plane of the tire, is greater than the amount of swelling of the first land portion, and is smaller than the amount of swelling of the second land portion.

5. The pneumatic tire according to claim 1, which satisfies a relationship of $H1/H2=(Sb/Sa) \times k$, wherein Sa represents the see-through void area on the first side relative to the equatorial plane in the tire width direction in the tread portion, Sb represents the see-through void area on the second side in the tire width direction, H1 represents an amount of swelling of the first land portion relative to the datum contour line, H2 represents an amount of swelling of the second land portion relative to the datum contour line, and k represents a value from 0.6 to 1.25 based on the condition that H1 is less than H2.

* * * * *